Figure 1:
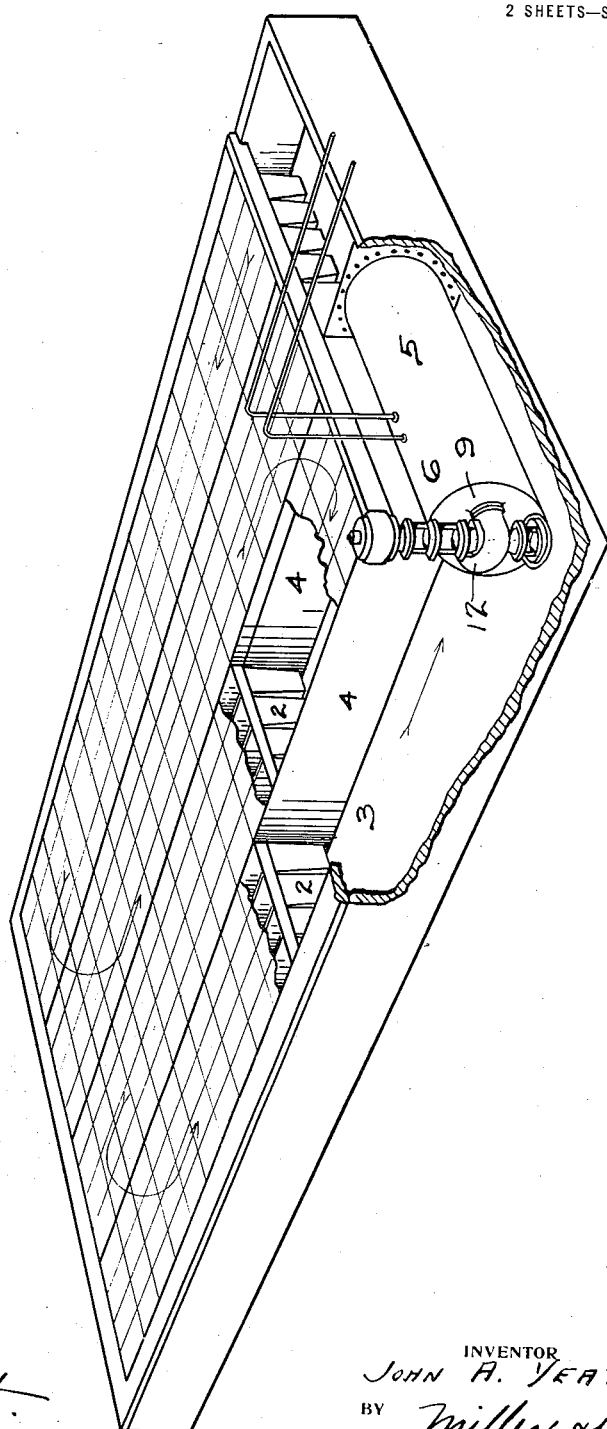

J. A. YEATMAN.
ICE MAKING MACHINERY.
APPLICATION FILED JAN. 23, 1913.

1,151,985.

Patented Aug. 31, 1915.
2 SHEETS—SHEET 1.

WITNESSES

INVENTOR
JOHN A. YEATMAN
BY Miller & White
his ATTORNEYS.

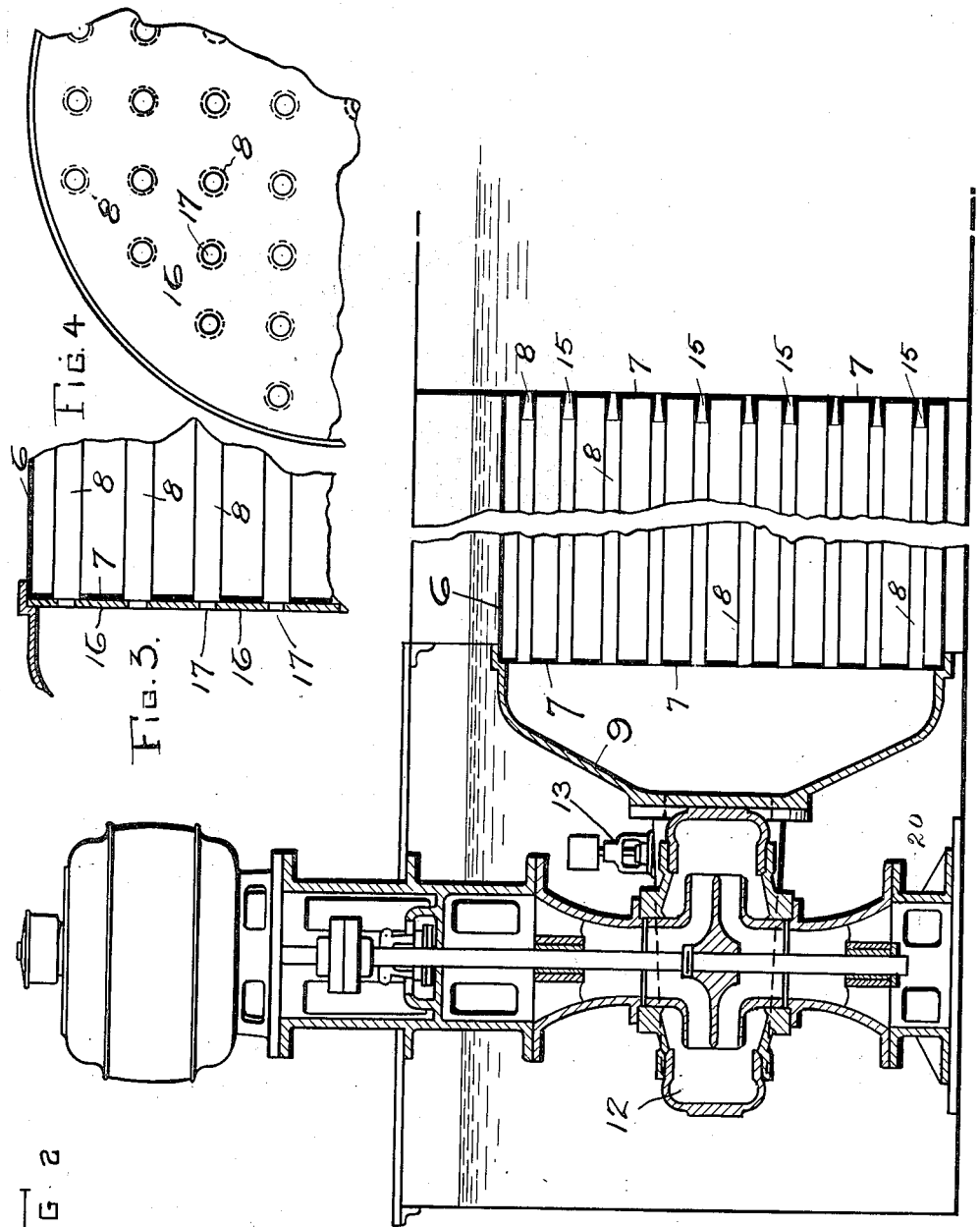

UNITED STATES PATENT OFFICE.

JOHN A. YEATMAN, OF OAKLAND, CALIFORNIA, ASSIGNOR TO UNITED IRON WORKS, OF OAKLAND, CALIFORNIA, A CORPORATION OF CALIFORNIA.

ICE-MAKING MACHINERY.

1,151,985.  Specification of Letters Patent.  Patented Aug. 31, 1915.

Application filed January 23, 1913. Serial No. 743,784.

*To all whom it may concern:*

Be it known that I, JOHN A. YEATMAN, a citizen of the United States, and a resident of Oakland, county of Alameda, and State of California, have invented certain new and useful Improvements in Ice-Making Machinery, of which the following is a specification.

The invention relates to ice making machinery and particularly to a brine cooler to be used in connection therewith.

The object of the invention is to obtain a substantially uniform flow of the brine through all of the tubes of the cooler.

Another object of the invention is to obtain a more rapid circulation of the brine than has heretofore been efficiently possible.

A further object of the invention is to cause the brine to flow through the tubes of the cooler under pressure.

The invention possesses other advantageous features, which, with the foregoing, will be set forth at length in the following description where I shall outline in full that form of the invention selected for illustration in the drawings accompanying and forming part of the present specification.

The novelty of the invention will be included in the claims succeeding said description. From this it will be apparent that I do not restrict myself to the showing made by said drawings and description as I may adopt many variations within the scope of my invention as expressed in said claims.

Referring to said drawings: Figure 1 is a perspective view of a brine tank for ice making, part of the wall thereof being broken away to disclose the brine cooler of my invention. Fig. 2 is a vertical cross section taken through the brine cooler and pump, part of the cooler being broken away to reduce the size of the figure. Fig. 3 is a fragmentary vertical section of the brine cooler showing a modification. Fig. 4 is a front view of the fragment shown in Fig. 3.

According to the present system of ice making, the ice cans 2 are arranged in a brine tank 3 which is divided into a tortuous channel by means of walls 4 extending alternately from the opposite ends. The cold brine is circulated through this channel, in which the ice cans are arranged, and the brine absorbs heat from the water or partly frozen water in the cans, thereby raising the temperature of the brine. The warmer brine is delivered into a channel or trough extending across the end of the tank, which channel or chamber is in communication with the opposite ends of the tortuous channel.

In the transverse channel is arranged a brine cooler 5 which is generally submerged in the brine, and through and around which the warmed brine passes, and its temperature is thereby reduced. The brine cooler consists of a cylindrical shell 6 closed at the opposite ends by the heads 7, in which are fixed tubes 8, extending through the shell. The brine passes through these tubes and around the outside of the shell, through which ammonia is circulated. The brine has heretofore circulated through the channels and brine cooler by means of a propeller or similar mechanism submerged in the brine at some point in its path. It has been heretofore impossible, however, to secure a uniform flow of the brine through all of the tubes of the cooler when some or all of the ice cans were withdrawn, thereby causing the level of the brine to drop below the upper tubes in the cooler. As a result some of the upper tubes would freeze, impairing the circulation of the brine through the cooler and thereby greatly reducing the efficiency of the cooler.

In order to enable the apparatus to operate at its highest efficiency, it is necessary that a constant and uniform supply of brine be forced through all of the tubes at their full capacity during all conditions in the operation of the apparatus. The means for accomplishing this may be as follows. A receiver comprising a hood 9 is attached to one end of the brine cooler and incloses the ends of the tubes which project through the head 7 at said end of the receiver. A pump 12 having a suction inlet 20 located at the bottom of the tank, communicates with said receiver and pumps the brine from the tank through said inlet into said receiver and through the tubes 8. By running the pump continuously and at the proper rate of speed, a constant and uniform supply of brine is forced through all the tubes 8 at once at their full capacity and the tubes kept full of fresh brine. The location of the suction inlet 20 is such that the apparatus may be operated in this manner at its highest efficiency during the normal variation of the level of the brine in the tank.

In order that the brine in the tubes may be under pressure and the tubes maintained constantly full, the tubes may be constricted in area at some point. The tubes may be constricted at either end or intermediate between the ends, but the employment of the end constriction is desirable, and I prefer to constrict the tubes at the discharge end, since this arrangement insures the complete filling of the tubes with brine under pressure, but I do not limit myself to such construction. I prefer to constrict the ends of the tubes by the use of nozzles 15 which may be screwed or otherwise held in position. Instead of nozzles, I may use the construction shown in Figs. 3 and 4 in which one terminal of the tubes is restricted by a plate 16 having apertures 17 therein, which register with the tubes, attached to the shell or receiver so that it is fixed in contact with the end of the shell.

The invention contemplates also, the arrangement of the centrifugal pump at the discharge end of the brine cooler, in which position a negative pressure will be established in the receiver, which in combination with nozzles or constricted openings at the discharge end of the tubes would produce a uniform flow of the brine through all of the tubes.

The invention herein described produces a more rapid circulation of the brine than has been heretofore accomplished, which produces a more efficient cooling of the brine and consequently a more efficient ice making machine. The brine is positively driven through the brine cooler and the pressure in the receiver may be fixed so that the desired speed of circulation is obtained.

I claim:

1. A brine cooler comprising a closed end shell, tubes extending through said shell, said tubes being partly constricted in area at one point, and means for circulating the brine through said tubes.

2. A brine cooler comprising a substantially horizontally arranged closed end shell, tubes extending through said shell constricted at one point, a receiver inclosing one end of said shell, means for introducing brine under pressure into said receiver, and means for maintaining the pressure within the receiver substantially constant.

3. A brine cooler comprising a closed end shell, tubes extending therethrough, said tubes being constricted in area at one end, a receiver inclosing one end of said shell, and means for introducing brine under pressure into said receiver.

4. A brine cooler comprising a closed end shell, tubes extending therethrough constricted at the discharge end, a receiver inclosing the intake end of said shell, and means for introducing brine under pressure into said receiver.

In testimony whereof, I have hereunto set my hand at San Francisco, Cal., this 14th day of January, 1913.

JOHN A. YEATMAN.

In presence of—
H. G. PROST,
M. LE CONTE.